United States Patent Office 3,117,146
Patented Jan. 7, 1964

3,117,146
ORGANOTIN HYDROXIDES
Maurice L. Zweigle and Henry Tolkmith, Midland, Mich., assignors to The Dow Chemical Company, Midland, Mich., a corporation of Delaware
No Drawing. Filed Aug. 5, 1960, Ser. No. 47,589
3 Claims. (Cl. 260—429.7)

The present invention is concerned with novel organotin hydroxides and is particularly directed to compounds corresponding to the formula

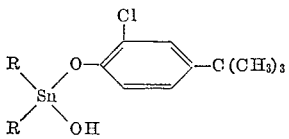

wherein R represents phenyl or an alkyl group containing from 1 to 4, inclusive, carbon atoms. The present compounds are solids of limited solubility in water, moderately soluble in many common organic solvents. They are useful in numerous agricultural applications. Specifically, the compounds have value as fungicides; they are useful as insecticides; and in suitable applications they are selective herbicides. They are useful also for the control of internal parasites of warm-blooded animals and, when suitably exhibited, may be used as rodenticides.

These compounds are prepared by a reaction between an organotin oxide compound and 4-tertiarybutyl-2-chlorophenol.

The reaction is conveniently carried out in a liquid reaction medium and takes place without preparation of by-products. The reaction is moderately endothermic, and takes place smoothly at temperatures in the range of 30°–150° C. Within the stated range, temperatures may vary or, if desired, may conveniently be regulated by employing a liquid reaction medium boiling at a desired reaction temperature wherein the reaction may be carried out by heating a reaction mixture to reflux. Good results are obtained when employing substantially chemical equivalent amounts of the organotin oxide and phenol compound. One phenolic hydroxyl group reacts with one organotin oxide group.

In carrying out the reaction, the organotin compound and 4-tertiary-butyl-2-chlorophenol may be combined slowly, portionwise, in solvent and with stirring, or alternatively they may be combined as single portions with or without solvent, the addition of solvent being carried out, if desired, only immediately before the beginning of heating. The reaction may be carried out in any desired inert liquid reaction medium, such as methylene chloride, benzene, toluene, carbon tetrachloride, mixed technical dichlorobenzenes and the like. The reaction mixture comprising organotin oxide, phenol compound, and reaction medium is thereafter heated at a temperature in the reaction temperature range for a period of time to carry the reaction to completion.

Upon completion of the reaction, the desired product may be separated in various ways, conveniently by evaporation and removal of reaction medium. The resulting product may, if desired, be purified in known ways such as by fractional crystallization from solvent and the like.

The following examples illustrate the invention but are not to be considered as limiting it.

EXAMPLE 1

Di-n-Butyl 2-Chloro-4-t-Butylphenoxytin Hydroxide

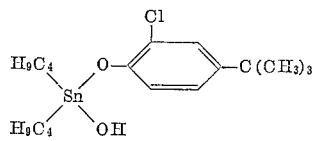

A mixture of 25 grams (0.1 mole) di-n-butyltin oxide and 18.4 grams (0.1 mole) 2-chloro-4-t-butylphenol was dispersed in 400 milliliters methylene chloride and the resulting mixture was heated gently over an electric mantle and under reflux at a temperature of 40°–42° C. for 3.5 hours. Thereafter, the reflux apparatus was disconnected and the resulting reaction mixture was gently warmed to vaporize and remove reaction solvent leaving a solid white di-n-butyl 2-chloro-4-t-butylphenoxytin hydroxide product having a melting point of 118–121° C. The resulting product was analyzed and found to contain, by weight, 26.6 percent tin, 7.76 percent chlorine and to have an average molecular weight of 430.8 as compared with theoretical values of 27.5, 8.18 and 433.

In similar manner, by the employment of diethyltin oxide and 2-chloro-4-t-butylphenol, there is obtained a white crystalline solid diethyl 2-chloro-4-t-butylphenoxytin hydroxide product.

Also, by the employment of dimethyltin oxide there is obtained a white, crystalline solid dimethyl 2-chloro-4-t-butylphenoxytin hydroxide product.

Also, by the employment of diphenyltin oxide there is obtained a white, crystalline solid diphenyl 2-chloro-4-t-butylphenoxytin hydroxide product.

The organotin hydroxide compounds of the present invention are useful as parasiticides, insecticides, as selective herbicides, and are adapted to be employed for the control of fungal organisms parasitic upon desired plants as plant diseases. For such uses, the compounds may be employed directly. Alternatively, the compounds may be dispersed on inert finely divided solids and the resulting preparations employed as dusts. Also, such preparations may be dispersed in water with or without the aid of wetting agents and the resulting aqueous suspensions employed as sprays. In other procedures, the compounds may be employed in solvents or as constituents of solvent-in-water or water-in-solvent emulsions or as aqueous dispersions which may be applied by spray, drench, or wash. In a representative operation, an aqueous dispersion containing dibutyl 4-tertiary-butyl-2-chloro-phenoxytin hydroxide at the rate of 2 pounds per hundred gallons of composition applied as a wetting spray gives virtually complete protection to a group of young tomato plants which are subsequently inoculated with viable spores of tomato late blight; whereas, as check population similarly innoculated but not protected by the present tin compound is heavily infested with the said organism.

We claim:

1. A compound corresponding to the formula

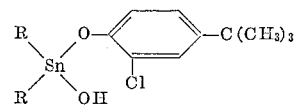

wherein R is a member of the group consisting of alkyl containing from 1 to 4, inclusive, carbon atoms and phenyl.

2. Di-n-butyl 2-chloro-4-t-butylphenoxytin hydroxide.

3. A method of preparing a compound corresponding to the formula

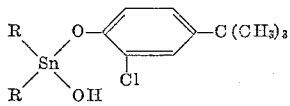

of which the essential step consists of causing a reaction between equimolecular amounts of a compound corresponding to the formula

and 4-tertiary-butyl-2-chlorophenol and thereafter separating said compound corresponding to the formula

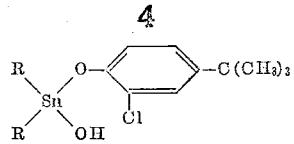

wherein R is a member of the group consisting or alkyl containing from 1 to 4, inclusive, carbon atoms and phenyl.

References Cited in the file of this patent
UNITED STATES PATENTS

| | | |
|---|---|---|
| 2,583,084 | Burt | Jan. 22, 1952 |
| 2,626,954 | Albert | Jan. 27, 1953 |
| 2,867,641 | Ramsden | Jan. 6, 1959 |

OTHER REFERENCES

Harada: "Sci. Papers Inst. Phys. and Chem. Research" (Tokyo) 35 (1939), page 304.